(12) United States Patent
Mu

(10) Patent No.: US 12,095,572 B2
(45) Date of Patent: Sep. 17, 2024

(54) METHOD AND APPARATUS FOR TRANSMITTING HYBRID AUTOMATIC REPEAT REQUEST FEEDBACK, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 404 days.

(21) Appl. No.: 17/616,029

(22) PCT Filed: Jun. 3, 2019

(86) PCT No.: PCT/CN2019/089886
§ 371 (c)(1),
(2) Date: Dec. 2, 2021

(87) PCT Pub. No.: WO2020/243887
PCT Pub. Date: Dec. 10, 2020

(65) Prior Publication Data
US 2022/0321279 A1    Oct. 6, 2022

(51) Int. Cl.
*H04L 1/18* (2023.01)
*H04L 1/1812* (2023.01)
*H04L 1/1829* (2023.01)

(52) U.S. Cl.
CPC .......... *H04L 1/1854* (2013.01); *H04L 1/1812* (2013.01); *H04L 1/1861* (2013.01); *H04L 1/1864* (2013.01)

(58) Field of Classification Search
CPC ... H04L 1/1854; H04L 1/1812; H04L 1/1861; H04L 1/1864; H04L 1/1896; H04L 1/08; H04L 1/1829; H04L 1/1867
See application file for complete search history.

(56) References Cited

U.S. PATENT DOCUMENTS

| 2017/0265193 A1* | 9/2017 | Wang | H04W 4/70 |
| 2019/0364557 A1* | 11/2019 | Harada | H04W 72/0446 |
| 2022/0007388 A1* | 1/2022 | Lee | H04B 7/0626 |

FOREIGN PATENT DOCUMENTS

| CN | 103314560 A | 9/2013 |
| CN | 104040930 A | 9/2014 |

(Continued)

OTHER PUBLICATIONS

European Patent Application No. 19931536.7, extended Search and Opinion dated Apr. 22, 2022, 13 pages.

(Continued)

*Primary Examiner* — Lan-Huong Truong
(74) *Attorney, Agent, or Firm* — Cozen O'Connor

(57) ABSTRACT

A method and an apparatus for transmitting hybrid automatic repeat request feedbacks. The method includes: when a preset condition is met, for a multi-transmission block TB scheduling transmission, adopting a target HARQ feedback transmission mode to transmit HARQ feedbacks. Adopting the target HARQ feedback transmission mode to transmit HARQ feedbacks comprises: encoding HARQ feedbacks of any multiple TBs received to generate and transmit HARQ feedback information. The multi-TB scheduling transmission is configured to transmit multiple TBs with a physical downlink control channel PDCCH resource.

17 Claims, 8 Drawing Sheets

(56) References Cited

FOREIGN PATENT DOCUMENTS

| CN | 104662831 A | 5/2015 | | |
|----|----|----|----|----|
| CN | 109565661 A | 4/2019 | | |
| WO | WO-2018128474 A1 * | 7/2018 | ........... | H04L 1/0057 |
| WO | WO 2019095317 A | 5/2019 | | |

OTHER PUBLICATIONS

Lenovo et al. "Design of scheduling of multiple DL/UL transport blocks for MTC" 3GPP TSG RAN WG1 Meeting #96bis; R1-19021xx; Apr. 2019; 5 pages.
LG Electronics "Discussion on multiple transport blocks scheduling in MTC" 3GPP TSG RAN WG1 #97; R1-1906683; May 2019; 12 pages.
International Patent Application No. PCT/CN2019/089886, International Search Report dated Feb. 21, 2020, 3 pages.

* cited by examiner

METHOD AND APPARATUS FOR TRANSMITTING HYBRID AUTOMATIC REPEAT REQUEST FEEDBACK, AND STORAGE MEDIUM

CROSS-REFERENCE TO RELATED APPLICATION

This application is the US national phase application of International Application No. PCT/CN2019/089886, filed on Jun. 3, 2019, the entire content of which is incorporated herein by reference for all purposes.

TECHNICAL FIELD

The disclosure relates to the field of communication technologies, in particular to a method and an apparatus for transmitting hybrid automatic repeat request feedbacks in a wireless network.

BACKGROUND

Machine Type Communication (MTC) is a typical feature of cellular Internet of Things technology. At present, MTC has been widely used in smart cities, for such tasks as meter reading; smart agriculture including temperature and humidity information collection, smart transportation including vehicle sharing, and many other areas.

In alternating Transmission Block (TB) transmission scheduling, transmissions of multiple TBs alternate. If the transmission of a TB fails, the MTC sends a Hybrid Automatic Repeat Request (HARQ) feedback. However, abnormalities occur in the HARQ feedback sending process of an MTC terminal as well as in other devices, resulting in a high failure rate of HARQ feedback sending.

In order to reduce the high failure rate of HARQ feedback, the HARQ feedback transmission mode can also be configured by a base station. Frequent base station configuration causes complex communication flow and wastes signaling overhead.

SUMMARY

According to a first aspect of embodiments of the present disclosure, a method for transmitting hybrid automatic repeat request HARQ feedbacks is provided. The method is applied to a terminal, and includes:
when a preset condition is met, for a multi-transmission block TB scheduling transmission, adopting a target HARQ feedback transmission mode to transmit HARQ feedbacks, wherein adopting the target HARQ feedback transmission mode to transmit HARQ feedbacks includes: encoding HARQ feedbacks of any multiple TBs received to generate and transmit HARQ feedback information,
wherein the multi-TB scheduling transmission is configured to transmit multiple TBs with a physical downlink control channel PDCCH resource.

According to a second aspect of embodiments of the present disclosure, a method for transmitting hybrid automatic repeat request HARQ feedbacks is provided. The method is applied to a base station, and includes:
when a preset condition is met, for a multi-transmission block TB scheduling transmission, adopting a target HARQ feedback receiving mode to receive HARQ feedbacks, wherein adopting the target HARQ feedback receiving mode to receive HARQ feedbacks includes: receiving HARQ feedback information generated and transmitted by a terminal through encoding HARQ feedbacks of any multiple TBs received,
wherein the multi-TB scheduling transmission is configured to transmit multiple TBs with a physical downlink control channel PDCCH resource.

According to a third aspect of embodiments of the present disclosure, a non-transitory storage medium is provided. The storage medium is stored thereon with an executable program, wherein when the executable program is executed by a processor, a method for transmitting hybrid automatic repeat request HARQ feedbacks provided by the first aspect is implemented.

According to a fourth aspect of embodiments of the present disclosure, a non-transitory storage medium is provided. The storage medium is stored thereon with an executable program, wherein when the executable program is executed by a processor, a method for transmitting hybrid automatic repeat request HARQ feedbacks provided by the second aspect is implemented.

According to a fifth aspect of embodiments of the present disclosure, an apparatus for transmitting hybrid automatic repeat request HARQ feedbacks is provided. The apparatus includes a processor, a memory and an executable program stored on the memory and capable of being executed by the processor, wherein the processor is configured to implement a method for transmitting hybrid automatic repeat request HARQ feedbacks provided by the first aspect by executing the executable program.

According to a sixth aspect of embodiments of the present disclosure, an apparatus for transmitting hybrid automatic repeat request HARQ feedbacks is provided. The apparatus includes a processor, a memory and an executable program stored on the memory and capable of being executed by the processor, wherein the processor is configured to implement a method for transmitting hybrid automatic repeat request HARQ feedbacks provided by the second aspect by executing the executable program.

With the method and apparatus for transmitting hybrid automatic repeat request HARQ feedbacks and the storage medium provided by embodiments of the present disclosure, when the preset condition is met, for the multi-TB scheduling transmission, the target HARQ feedback transmission mode is used to transmit HARQ feedbacks. Transmitting the HARQ feedbacks using the target HARQ feedback transmission mode includes: encoding HARQ feedbacks of any multiple TBs received, to generate and transmit HARQ feedback information. Instead of configuring the HARQ feedback in real time, the transmission mode for HARQ feedback is determined based on the preset condition, which simplifies the configuration process and saves signaling costs. Moreover, the HARQ feedback information generated by encoding multiple HARQ feedbacks is used to reflect the decoding situation of multiple TBs, so as to reduce the overlap of HARQ feedbacks of any multiple TBs in time domain resources, thus reducing the time domain complexity when the HARQ feedback sending device sends the HARQ feedbacks, reducing the demand for processing capacity of the HARQ feedback sending device, further improving the success rate of HARQ feedback sending and the stability of the HARQ feedback sending device.

It should be understood that the general description above and the detailed description below are only illustrative and explanatory and do not limit embodiments of the present disclosure.

BRIEF DESCRIPTION OF THE DRAWINGS

The appended drawings herein are incorporated into the specification and form a part of the specification, showing the principles in conformity with embodiments of the disclosure and used together with the specification to explain embodiments of the disclosure.

DETAILED DESCRIPTION

Exemplary embodiments will be explained in detail here, and examples are shown in the attached drawings. Where the following description relates to appended drawings, the same numbers in different appended drawings indicate the same or similar elements, unless otherwise indicated. Implementations described in the following exemplary embodiments do not represent all implementations consistent with embodiments of the present disclosure. Rather, they are only examples of devices and methods which are consistent with some aspects of embodiments of the disclosure as detailed in the attached claims.

The terms used in embodiments of the disclosure are intended solely to describe a particular embodiment and are not intended to restrict embodiments of the disclosure. The singular forms "a", "said" and "the" used in embodiments of the disclosure and the accompanying claims are also intended to include majority forms, unless the context clearly indicates otherwise. It should also be understood that the terms "and/or" used herein refer to include any or all possible combinations of one or more associated listed items.

It should be understood that, although the terms first, second, third, etc., may be used in embodiments of this disclosure to describe various information, such information should not be limited to those terms. These terms are used only to distinguish information of the same type from one another. For example, without departing from the scope of embodiments of this disclosure, first information may also be referred to as second information, and similarly, second information may also be referred to as first information. Depending on the context, the word "if" used here can be interpreted as "when . . . " or "at the time of . . . " or "in response to determining . . . ".

Figure 1:
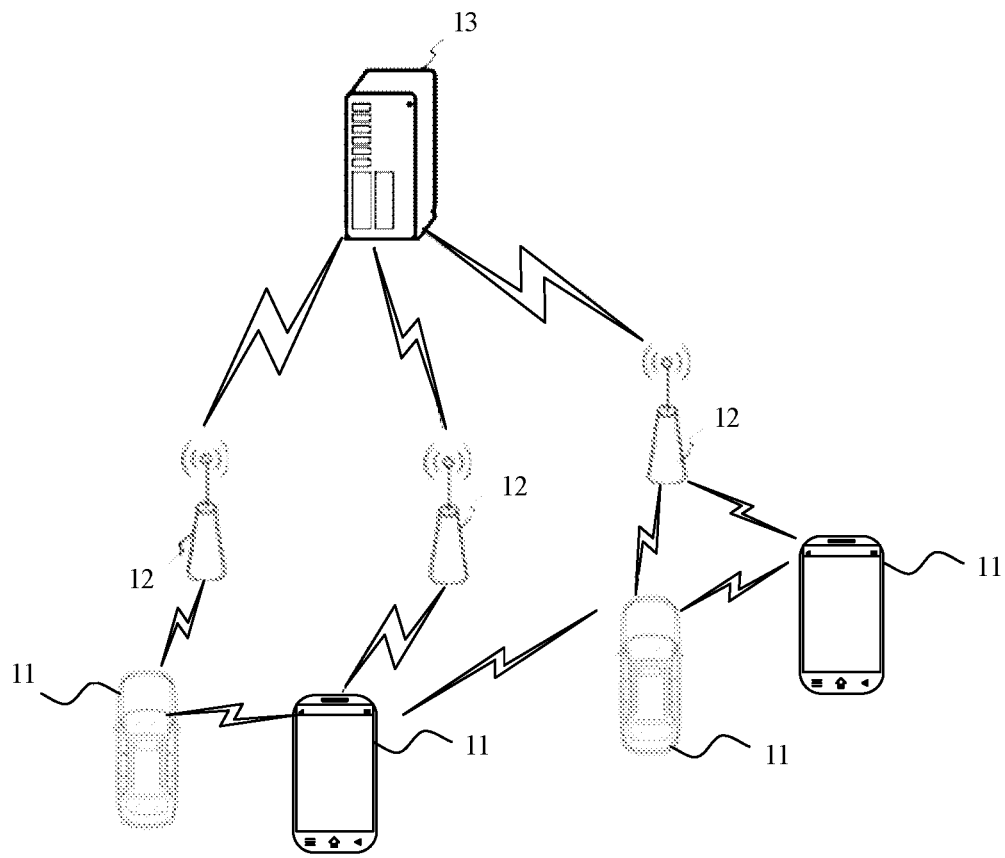
FIG. 1 is a schematic diagram illustrating a wireless communication system according to an exemplary embodiment.

FIG. 1 is a schematic diagram illustrating a wireless communication system according to embodiments of the disclosure. As illustrated in FIG. 1, the wireless communication system is a communication system based on cellular mobile communication technology, and the wireless communication system may include several base stations 110 and several terminals 120.

Each terminal 11 may be a device that provides voice and/or data connectivity to users. The terminal 11 can communicate with one or more core networks over a Radio Access Network (RAN), and the terminal 11 may be IOT terminals such as sensor devices, mobile phones (or "cellular" phones), and computers with IOT terminals, for example, which may be stationary, portable, pocket, hand-held, computer-built or vehicle-mounted devices. For example, the terminal may be a station (STA), subscriber Unit, subscriber station, mobile station, mobile, remote station, access point, remote terminal, access terminal, user terminal, user agent, user device, or user equipment (UE). Alternatively, the terminal 11 may also be an unmanned vehicle. Alternatively, the terminal 11 may be an on-board device, for example, a driving computer with wireless communication capabilities, or a wireless communication device connected to an external driving computer. Alternatively, the terminal 11 may be a roadside device, such as a street lamp, signal light, or other roadside device with wireless communication capabilities.

The base station 12 may be a network side device in a wireless communication system. The wireless communication system may be the 4th generation mobile communication (4G) system, also known as Long Term Evolution (LTE) system. Alternatively, the wireless communication system may be a 5G system, also known as a New Radio (NR) system or a 5G NR system. Alternatively, the wireless communication system may be the next generation of 5G systems. The Access Network in 5G system may be called NG-RAN (New Generation-Radio Access Network). Alternatively, the wireless communication system may be an MTC system.

The base station 12 may be an evolved base station (eNB) used in 4G systems. Alternatively, the base station 12 may be a base station with a centralized distributed architecture (gNB) in 5G systems. When the base station 12 adopts the centralized distributed architecture, it usually includes a central unit (CU) and at least two distributed units (DUs). The centralized unit is provided with protocol stacks of a Packet Data Convergence Protocol (PDCP) layer, a Radio Link Control (RLC) layer, and a Media Access Control (MAC) layer. The distributed unit is provided with a Physical (PHY) layer protocol stack. The specific implementation of the base station 12 is not limited in embodiments of the disclosure.

A wireless connection may be established between the base station 12 and the terminal 11 through a wireless air interface. In different implementations, the wireless air interface is a wireless air interface based on the fourth generation mobile communication network technology (4G) standard. Alternatively, the wireless air interface is a wireless air interface based on the fifth generation mobile communication network technology (5G) standard, such as the wireless air interface is a new air interface. Alternatively, the wireless air interface may be a wireless air interface based on the next generation of mobile network technology standard of 5G.

In some embodiments, an E2E (End to End) connection can also be established between terminals 11, for example, in scenarios of vehicle-to-vehicle (V2V) communication, vehicle-to-infrastructure (V2I) communication, and vehicle-to-pedestrian (V2P) communication in Vehicle to Everything (V2X) communication.

In some embodiments, the wireless communication system may also include a network management device 13.

Several base stations 12 are connected with the network management device 13 respectively. The network management device 13 may be a core network device in the wireless communication system. For example, the network management device 13 may be a mobility management entity (MME) in Evolved Packet Core (EPC) networks. Alternatively, the network management device may also be other core network device, such as serving gateway (SGW), public data network gateway (PGW), policy and charging rules function (PCRF) or home subscriber server (HSS). The implementation form of network management device 13 is not limited in embodiments of the present disclosure.

The executive bodies involved in embodiments of the disclosure include but are not limited to: devices that use MTC for communication transmission, such as MTC terminals, IOT terminals and other MTC clients.

Figure 2:
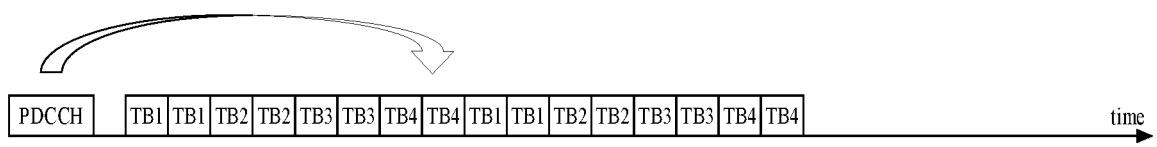
FIG. 2 is a schematic diagram illustrating an alternating TB transmission according to an exemplary embodiment.

The application scenarios in embodiments of the disclosure are as follows. In view of weak signal coverage of MTC, and relatively low cost and low processing capacity of MTC devices, MTC adopts the mechanism of alternating TB transmission in multi-TB scheduling, that is, alternating and repeated transmission of different TBS. FIG. 2 shows alternating and repeated transmission of TBs in a sequence.

Figure 3:
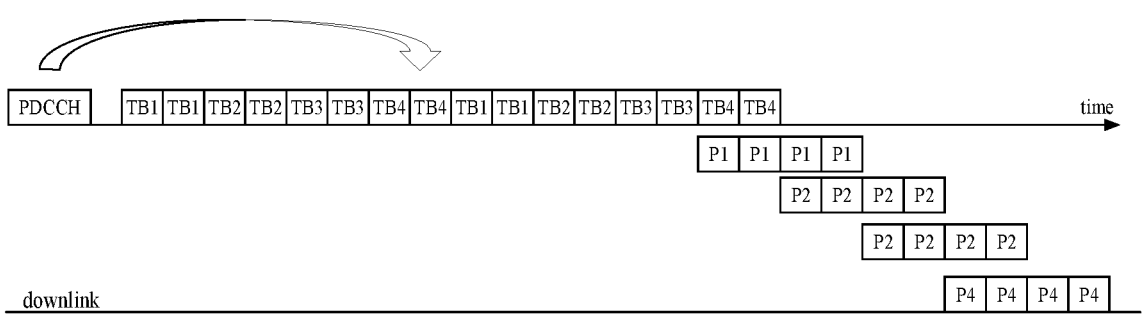
FIG. 3 is a schematic diagram illustrating HARQ feedback time overlap according to an exemplary embodiment.

With this way of alternating TB transmission, the end time of the transmission of respective TBs is close. In accordance with the method of transmitting HARQ feedback adopted by relevant MTC, as shown in FIG. 3, a plurality of HARQ feedbacks with respect to any TBs are overlapped in time, thereby increasing the complexity of the HARQ feedback sending device, i.e., the MTC client, to process the HARQ feedback, and even causing that the HARQ feedback sending device cannot work due to the performance limitation of the HARQ feedback sending device. P1 to P4 respectively indicate HARQ feedback of TB1 to TB4, and multiple P1 to P4 indicate that P1 to P4 have been repeatedly transmitted for many times.

HARQ feedback transmission can be configured to reduce the time overlap of HARQ feedbacks, but HARQ feedbacks still have a high probability of time overlap. If the base station is required to perform configuration every time transmitting the HARQ feedback, the whole communication process will be complicated and the signaling overhead will be wasted.

Figure 4:
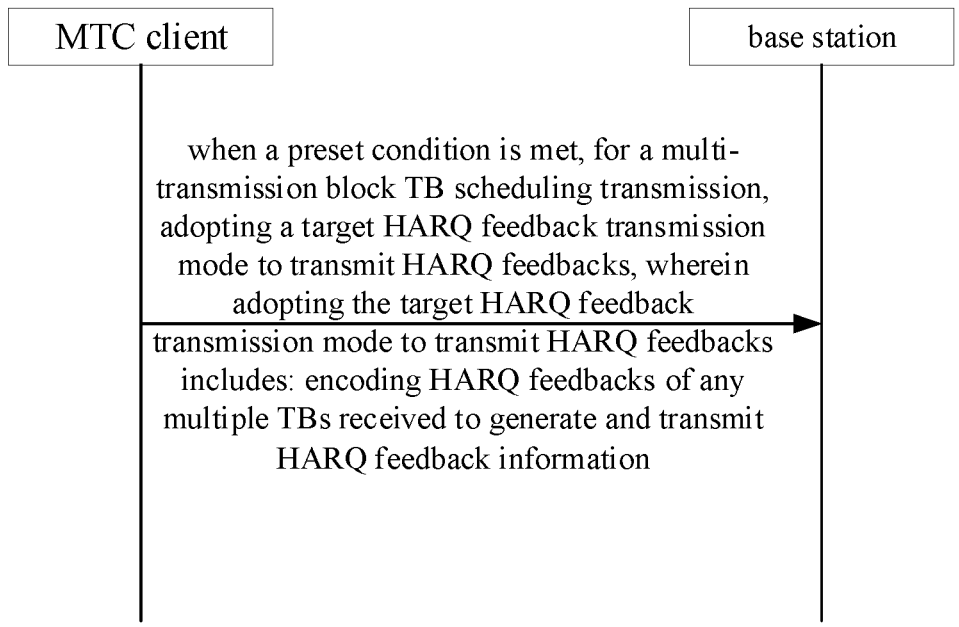
FIG. 4 is a flow chart illustrating a method for transmitting HARQ feedbacks according to an exemplary embodiment.

As illustrated in FIG. 4, an exemplary embodiment of the present disclosure provides a method for transmitting HARQ feedbacks, which may be used in wireless communication devices such as terminals, including:

when a preset condition is met, for multi-TB scheduling transmission, a target HARQ feedback transmission mode is adopted to transmit the HARQ feedback, wherein, adopting the target HARQ feedback transmission mode to transmit the HARQ feedback includes: encoding HARQ feedbacks of any multiple TBs to generate and transmit HARQ feedback information.

The multi-TB scheduling transmission is configured to adopt a physical downlink control channel (PDCCH) resource to transmit multiple TBs.

In some embodiments, the alternating TB transmission includes: transmitting TB alternating transmission units cyclically until a total number of repeated transmissions configured for each TB is met. The TB alternating transmission unit contains N repeated transmission of different TBs, where N is greater than 0 and less than M, M is the total number of repeated transmissions.

Here, the terminal may be an MTC client; one TB alternating transmission unit includes at least two TBs, which are sorted in a certain order to form one TB alternating transmission unit.

Here, TB is a kind of content block. Different TBs contain different data contents. As illustrated in FIG. 2, the total number of repeated transmissions for a TB is 4. In a TB alternating transmission unit, a TB is repeatedly transmitted for N times. In FIG. 2, N is 2. The data content in TB1 is the same for the four total repeated transmissions, but the data contents in TB1 and TB2 are different. The contents of TB1 transmitted 4 times are the same. Through alternating transmission, the received power of the same TB can be accumulated, thus increasing the decoding success rate at the TB receiver.

The HARQ feedback sender, such as the MTC client, may set the HARQ feedback transmission mode rule in advance. The HARQ feedback transmission mode rule is configured to define the preset condition and the target transmission mode for HARQ feedback.

The HARQ feedback sender, such as the MTC client, after receiving multiple TBs, demodulates and decodes the TBs, and confirms whether the TBs are decoded successfully, and then encodes the HARQ feedback of respective TBs to obtain a HARQ feedback message, and sends the HARQ feedback message, which can reduce the overlapping situation of HARQ feedback in time, reduce the complexity of the HARQ feedback sender to process the HARQ feedback, reduce the performance requirements of the HARQ feedback sender, and then improve the success rate of sending the HARQ feedback information and improve the stability of the HARQ feedback sender. Here, a HARD feedback can be transmitted with a time domain resource.

The mode of encoding HARQ feedbacks of any multiple TBs to generate the HARQ feedback information for transmission may be called binding transmission. The generated HARQ feedback information may reflect the demodulation status of multiple TBs.

The transmission mode rule of the HARQ feedback at the MTC client may be corresponding to the receiving mode rule of the HARQ feedback at the base station, ensuring that when the MTC client sends the HARQ feedback information, the base station receives the HARQ feedback information in the corresponding way.

In this way, when the preset condition is met, the base station does not need additional signaling to configure the HARQ feedback transmission mode of the MTC client, but processes according to the preconfigured HARQ feedback transmission mode rule, simplifying the configuration process and saving signaling cost.

In some embodiments, a TB has a HARQ feedback.

Of course, in other embodiments, TBs transmitted repeatedly may have multiple HARQ feedbacks. If a TB has a HARQ feedback, it reduces transmission resources occupied by unnecessary HARQ feedback and saves transmission overhead.

In the alternating TB transmission shown in FIG. 2, The TB alternating transmission unit is transmitted twice, and a TB is repeated twice in an TB alternating transmission unit. The data in one TB transmitted repeatedly is the same, for example, the data in TB1 transmitted four times is the same.

In the alternating transmission, a TB will be transmitted alternately and repeatedly for many times. After receiving the TB transmitted for many times, the HARQ feedback sender will demodulate the TB received for many times together. The demodulation result is transmitted back to TB sender through HARQ feedback. The HARQ feedback includes ACK and NACK.

Specifically, ACK is fed back if the demodulation result is correct, and/or NACK is fed back if the demodulation result is incorrect.

As shown in FIG. 2, TB1 is transmitted for 4 times in the alternating repeated transmission. After analyzing TB1 transmitted for 4 times, the HARQ feedback sender will send a HARQ feedback to the base station to feed back whether TB1 is demodulated correctly. In the alternating transmission of TB1 to TB4 as shown in FIG. 2, the HARQ feedback sender will transmit a total of 4 HARQ feedbacks corresponding to TB1 to TB4 to the base station.

Here, a predetermined encoding may be performed on the HARQ feedbacks of any multiple TBs to obtain the HARQ feedback information obtained by encoding multiple HARQ feedbacks. The content of the HARQ feedback information can be determined according to the predetermined encoding, which can reflect the demodulation result information of multiple TBs, for example, can reflect in whole whether all the multiple TBs are correctly demodulated.

The HARQ feedback information may be one message, so that in the process of transmitting the HARQ feedback information, the overlapping of HARQ feedbacks of any multiple TBs can be reduced, the complexity of processing HARQ feedback can be reduced, the workload of the HARQ feedback sender can be reduced, and the stability of HARQ feedback sender can be improved.

In some embodiments, the preset condition includes: the transmission configuration information of the received TBs indicating that alternating transmission of TBs is allowed.

When the MTC client is configured to allow the alternating transmission, the MTC client by default encodes the HARQ feedbacks of any multiple TBs to generate the HARQ feedback information for transmission. By default, the base station receives the HARQ feedback information.

Here, the way to determine that the transmission configuration information determines allowing the alternating transmission of TB may be as follows. If the transmission configuration information of TB contains alternating transmission configuration information or other predetermined information, it is determined that the alternating transmission of TB is allowed. The TB that the HARQ feedback corresponds to may be transmitted alternately or may be transmitted in a common mode.

Thus, when the configuration information determines allowing the alternating transmission of TB, it means that there is a possibility to transmit the TB alternately, and the base station does not need additional signaling to configure the HARQ feedback transmission mode of the MTC client, but processes according to the preset HARQ feedback transmission mode rule, which simplifies the configuration process, and saves the signaling overhead.

In some embodiments, the preset condition includes: the transmission configuration information of the received TBs indicating that alternating transmission of TBs is allowed, and an alternating TB transmission mode having been activated.

In some embodiments, the alternating TB transmission mode having been activated includes: determining that the alternating TB transmission mode is used in a current TB scheduling transmission.

Here, by setting the HARQ feedback transmission mode rule in advance, the preset condition may be set to generate the HARQ feedback information from HARQ feedbacks of any multiple TBs alternately transmitted only when the alternating TB transmission mode is activated, that is, when TB is transmitted in the alternating transmission mode. The way to determine that the alternating TB transmission mode is activated may include: the alternating transmission configuration information in the transmission configuration information being applied, or the flag bit or the activation bit of the alternating transmission being set, or the alternating TB transmission mode being used in the current TB scheduling transmission.

For the TB transmitted in the conventional way, the corresponding HARQ feedback can still be transmitted in the existing one-to-one transmission or repeated transmission.

In this way, only for the HARQ feedbacks of TBs transmitted alternately, the overlapping of HARQ feedbacks of any multiple TBs in time domain resources can be reduced by generating the HARQ feedback information for transmitting.

This solution is applicable to the scenario where the base station is configured with an MTC client to allow alternating transmission, but the MTC client does not always use such solution in each subsequent transmission. The MTC client generates the HARQ feedback information only when the base station activates the alternating transmission function.

In some embodiments, the preset condition includes: transmission configuration information of the received TBs indicating that alternating transmission of TBs is allowed, and time domain resources for transmitting the HARQ feedbacks of any multiple TBs received having an overlap.

In some embodiments, the time domain resources for transmitting the HARQ feedbacks of any multiple TBs received may be determined according to transmission configuration information and a number of repeated transmissions of physical uplink control channel (PUCCH).

Specifically, it may be based on settings such as TB repetition times, total repetition times, PUCCH repeated transmission times, time domain resources used by transmitting TB and HARQ feedback in the TB alternating transmission. The Base station and MTC client can calculate the possibility of overlapping of time domain resources used to transmit HARQ feedbacks according to the alternating transmission mode of transmission configuration information of TB and the repeated transmission times of PUCCH. The alternating transmission mode may be the number of repeated transmissions of each TB in an alternating transmission unit. As shown in FIG. 3, the number of repeated transmissions for each TB in an alternating transmission unit is 2, and the number of repeated transmissions for PUCCH is 4. At this time, if one-to-one HARQ feedback is adopted, the time domain resources of PUCCH used to transmit HARQ feedbacks are highly likely to overlap. At this time, HARQ feedback information can be generated from HARQ feedbacks of any multiple TBs. The number of repeated transmissions of PUCCH can represent the number of repeated transmissions of HARQ feedbacks in the transmission.

When the MTC client estimates overlapping PUCCH time domain resources used to transmit HARQ feedback, the HARQ feedback information is generated based on HARQ feedbacks of any multiple TBs, and transmitted. In this way, the time overlap of HARQ feedbacks can be avoided and the failure rate of HARQ feedback transmission can be reduced.

For example, when the transmission configuration information determines that alternating TB transmission is allowed and there is overlap in the time domain resources used to transmit HARQ feedbacks of any multiple TBs received, the base station and MTC client adopt the default transmission mode, that is, the MTC client generates the HARQ feedback information according to multiple HARQ feedbacks of any TBs, and then transmits the HARQ feedback information, and the base station receives the HARQ feedback information.

If the base station has configured HARQ feedback binding transmission by default, the transmission is carried out as configured.

If the base station is not configured to adopt HARQ feedback binding transmission by default, the MTC client can calculate according to the alternating transmission mode configured to the user and the repeated transmission times of PUCCH. If the time domain resources of PUCCH used to transmit HARQ feedbacks overlap, then the HARQ feedback information is generated and transmitted to the base station. If there is no time domain resource overlap, the initial one-to-one HARQ feedback transmission mode is used to transmit HARQ feedbacks to the base station.

In some embodiments, the preset condition includes: the transmission configuration information of the received TB indicates that alternating transmission of TB is allowed, and the HARQ feedback transmission configuration instruction received from the base station indicates that HARQ feedbacks of any multiple TBs received are encoded to generate the HARQ feedback information.

Here, the base station instruction can be used to control whether the MTC client transmits HARQ feedbacks by generating the HARQ feedback information.

In some embodiments, encoding HARQ feedbacks of any multiple TBs received includes: performing a bitwise logic and operation on the HARQ feedbacks of any multiple TBs to obtain the HARQ feedback information.

Figure 5:
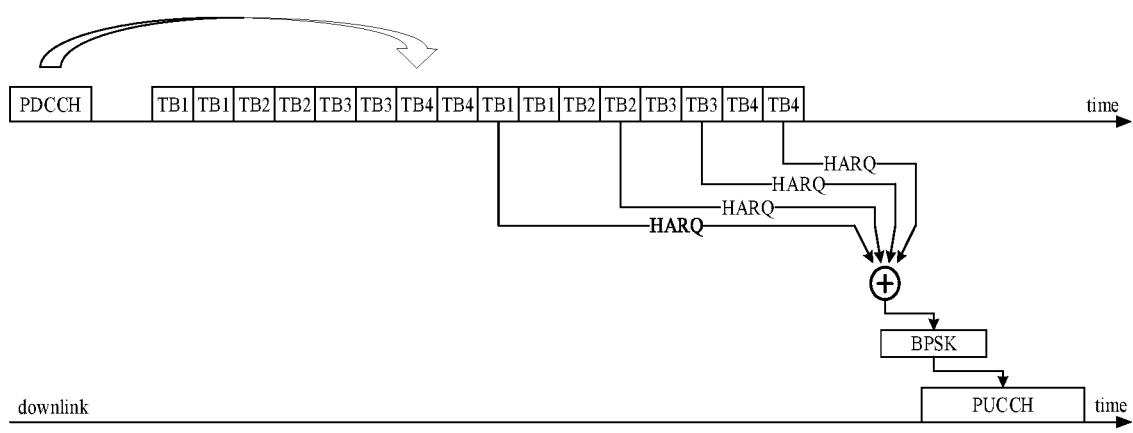
FIG. 5 is a schematic diagram illustrating HARQ feedback transmission according to an exemplary embodiment.

For example, as shown in FIG. 5, HARQ feedbacks corresponding to TB1 to TB4 can be processed by bitwise logic and operation, so as to obtain the HARQ feedback information reflecting the overall demodulation situation of TB1 to TB4. For example: the HARQ feedback of TB1 is "0", which means that the demodulation has failed; the HARQ feedbacks of TB2, TB3 and TB4 are "1", which means that the demodulation has succeeded. Then, after the bitwise logic and operation of all HARQ feedbacks, the HARQ feedback information is "0". After receiving the HARQ feedback information, the base station can know that demodulation of at least one TB of TB1 to TB4 has failed, and can send TB1 to TB4 again.

In some embodiments, the HARQ feedback information is modulated by binary phase shift keying (BPSK), and the BPSK modulated HARQ feedback information is transmitted.

Here, BPSK can be used to modulate the HARQ feedback information to meet the requirements of PUCCH, and carry the HARQ feedback information in PUCCH for transmission.

Multiple HARQ feedbacks are encoded into one HARQ feedback information to be transmitted through PUCCH, which avoids the time overlapping of HARQ feedbacks and reduce the workload of the HARQ feedback sender.

Figure 6:
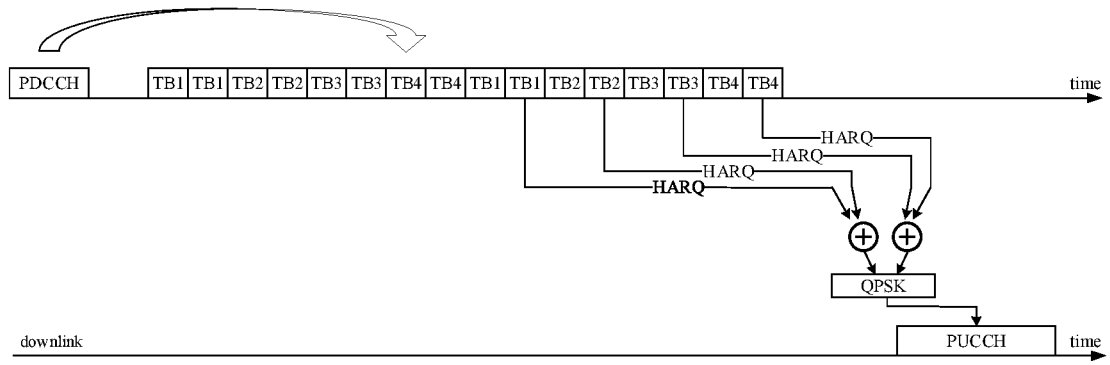
FIG. 6 is a schematic diagram illustrating HARQ feedback transmission according to another exemplary embodiment.

In some embodiments, encoding HARQ feedbacks of any multiple TBs received includes: performing a bitwise logic and operation on the HARQ feedbacks of any multiple TBs according to groups, to obtain different groups of HARQ feedbacks. For example, HARQ feedbacks of any multiple TBs may be divided into two groups, as shown in FIG. 6, HARQ feedbacks corresponding to TB1 to TB4 may be divided into two groups respectively. The HARQ feedback of TB1 and the HARQ feedback of TB2 form a group, and then carry out bitwise logic and processing to get a 1-bit result. The HARQ feedback of TB3 and the HARQ feedback of TB4 form another group, and carry out bitwise logic and processing to get a 1-bit result. The logic and results of the two groups are combined to form 2-bit HARQ feedback information. For example: the HARQ feedback of TB1 is "0", which means that the demodulation fails; the HARQ feedbacks of TB2, TB3 and TB4 are "1", which means that the demodulation succeeds. Then, the HARQ feedback information "1" of TB1 and TB2 is obtained after bitwise logic and operation, and the HARQ feedback information "1" of TB3 and TB4 is obtained after bitwise logic and operation. After receiving the HARQ feedback information, the base station can know that at least one TB of TB1 and TB2 has failed to demodulate, and TB1 and TB2 can be re-transmitted. Among them, which TBs form a group can be predetermined.

In some embodiments, quadrature phase shift keying (QPSK) is used to modulate the HARQ feedback information, and the QPSK modulated HARQ feedback information is transmitted.

Here, for 2-bit HARQ feedback information, QPSK can be used to modulate the HARQ feedback information to meet the requirements of PUCCH, and carry the HARQ feedback information in PUCCH for transmission.

Multiple HARQ feedbacks are encoded into one HARQ feedback information and transmitted through PUCCH, which avoids the time overlapping of multiple HARQ feedbacks and reduces the workload of the HARQ feedback sender.

In some embodiments, the HARQ feedback information is transmitted using PUCCH, and the HARQ feedback information is transmitted on the PUCCH resource ever since the third interval has elapsed after completion of the last TB transmission.

The HARQ feedback information is sent by using the end of transmission of the last TB as the reference point, for example, the transmission starts, for example, 4 ms after the end of transmission of the last TB. This sets time aside to allow encoding the HARQ feedbacks.

In this way, HARQ feedback information can be transmitted after all TB transmissions are completed, which reduces the occurrence of timing disorder.

The HARQ feedback information may be one message, so that in the process of transmitting the HARQ feedback information, the overlapping of HARQ feedbacks of any multiple TB in time can be reduced, the complexity of the HARQ feedback sender processing HARQ feedbacks can be reduced, the processing burden of the HARQ feedback sender can be reduced, and the stability of the HARQ feedback sender can be improved.

Figure 7:
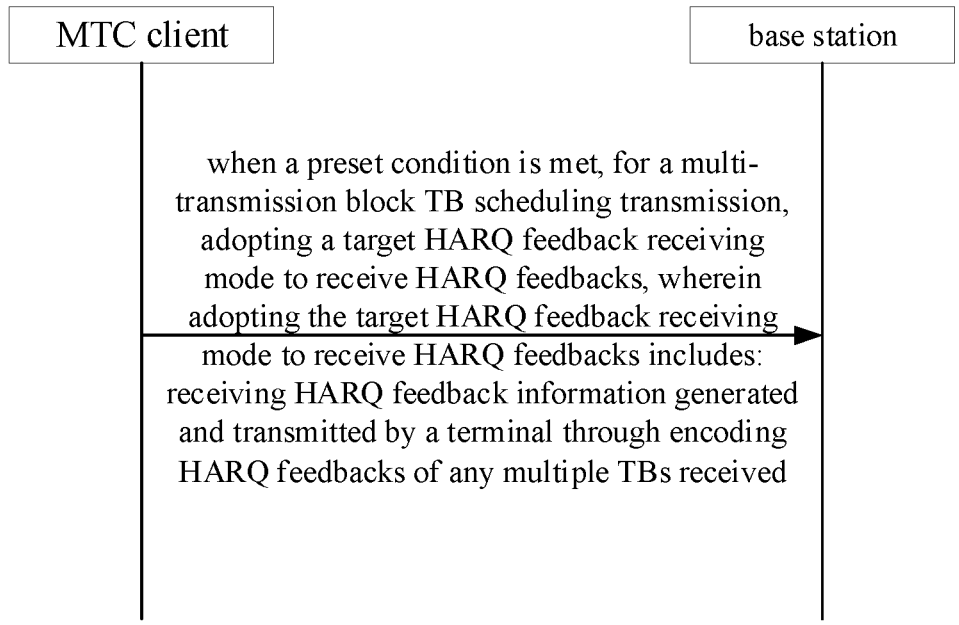
FIG. 7 is a flow chart illustrating a method for transmitting HARQ feedbacks according to an exemplary embodiment.

As illustrated in FIG. 7, an exemplary embodiment of the present disclosure provides a method for transmitting HARQ feedbacks. The method may be applied to the base station of MTC system, but is not limited to the base station of this system. The method includes:

when a preset condition is met, for multi-TB scheduling transmission, a target HARQ feedback receiving mode is adopted to receive the HARQ feedback, wherein, adopting the target HARQ feedback receiving mode to receive the HARQ feedback includes: receiving HARQ feedback information generated and transmitted by a terminal through encoding HARQ feedbacks of any multiple TBs received.

The multi-TB scheduling transmission is configured to adopt a physical downlink control channel (PDCCH) resource to transmit multiple TBs.

In some embodiments, the alternating TB transmission includes: transmitting TB alternating transmission units cyclically until a total number of repeated transmission configured for each TB is met. The TB alternating transmission unit contains N repeated transmission of different TBs, where N is greater than 0 and less than M, M is the total number of repeated transmissions.

Here, one TB alternating transmission unit includes at least two TBs, which are sorted in a certain order to form one TB alternating transmission unit.

Here, TB is a kind of content block. Different TBs contain different data contents. As illustrated in FIG. 2, the total number of repeated transmissions for a TB is 4. In a TB alternating transmission unit, a TB is repeatedly transmitted for N times. In FIG. 2, N is 2. The data content in TB1 is the same for the four total repeated transmissions, but the data contents in TB1 and TB2 are different. The contents of TB1 transmitted 4 times are the same. Through alternating transmission, the received power of the same TB can be accumulated, thus increasing the decoding success rate at the TB receiver.

In some embodiments, a TB has a HARQ feedback.

Of course, in other embodiments, TBs transmitted repeatedly may have multiple HARQ feedbacks. If a TB has a HARQ feedback, it reduces transmission resources occupied by unnecessary HARQ feedback and saves transmission overhead.

In the alternating transmission, a TB will be transmitted alternately and repeatedly for many times. After receiving the TB transmitted for many times, the HARQ feedback sender will demodulate the TB received for many times together. The demodulation result is transmitted back to TB sender through HARQ feedback. The HARQ feedback includes ACK and NACK.

Specifically, ACK is fed back if the demodulation result is correct, and/or NACK is fed back if the demodulation result is incorrect.

As shown in FIG. 2, TB1 is transmitted for 4 times in the alternating repeated transmission. After analyzing TB1 transmitted for 4 times, the HARQ feedback sender will send a HARQ feedback to the base station to feed back whether TB1 is demodulated correctly. In the alternating transmission of TB1 to TB4 as shown in FIG. 2, the HARQ feedback sender will transmit a total of 4 HARQ feedbacks corresponding to TB1 to TB4 to the base station.

Here, a predetermined encoding may be performed on the HARQ feedbacks of any multiple TBs to obtain the HARQ feedback information obtained by encoding multiple HARQ feedbacks. The content of the HARQ feedback information can be determined according to the predetermined encoding, which can reflect the demodulation result information of multiple TBs, for example, can reflect in whole whether all the multiple TBs are correctly demodulated.

The HARQ feedback information may be one message, so that in the process of transmitting the HARQ feedback information, the overlapping of HARQ feedbacks of any multiple TBs can be reduced, the complexity of processing HARQ feedback can be reduced, the workload of the HARQ feedback sender can be reduced, and the stability of HARQ feedback sender can be improved.

The base station can set the receiving mode rule of HARQ feedback in advance. The receiving mode rule of HARQ feedback is configured to define the preset condition and the target receiving mode for HARQ feedback. When the preset condition is met, the HARQ feedback information is received by the target receiving mode for HARQ feedback The transmission mode rule of the HARQ feedback at the MTC client may be corresponding to the receiving mode rule of the HARQ feedback at the base station, ensuring that when the MTC client sends the HARQ feedback information, the base station receives the HARQ feedback information in the corresponding way.

In this way, when the preset condition is met, the base station does not need additional signaling to configure the HARQ feedback transmission mode of the MTC client, but processes according to the preconfigured HARQ feedback transmission mode rule, simplifying the configuration process and saving signaling cost.

In some embodiments, the preset condition includes: the transmission configuration information of the sent TBs indicating that alternating transmission of TBs is allowed.

When the MTC client is configured to allow the alternating transmission, the MTC client by default encodes the HARQ feedbacks of any multiple TBs to generate the HARQ feedback information for transmission. By default, the base station receives the HARQ feedback information.

Here, the way to determine that the transmission configuration information determines allowing the alternating transmission of TB may be as follows. If the transmission configuration information of TB contains alternating transmission configuration information or other predetermined information, it is determined that the alternating transmission of TB is allowed. The TB that the HARQ feedback corresponds to may be transmitted alternately or may be transmitted in a common mode.

Thus, when the configuration information determines allowing the alternating transmission of TB, it means that there is a possibility to transmit the TB alternately, and the base station does not need additional signaling to configure the HARQ feedback transmission mode of the MTC client, but processes according to the preset HARQ feedback transmission mode rule, which simplifies the configuration process, and saves the signaling overhead.

In some embodiments, the preset condition includes: the transmission configuration information of the sent TBs indicating that alternating transmission of TBs is allowed, and an alternating TB transmission mode having been activated.

Here, by setting the HARQ feedback transmission mode rule in advance, the preset condition may be set to generate the HARQ feedback information from HARQ feedbacks of any multiple TBs alternately transmitted only when the alternating TB transmission mode is activated, that is, when TB is transmitted in the alternating transmission mode. The way to determine that the alternating TB transmission mode is activated may include: the alternating transmission configuration information in the transmission configuration information being applied, or the flag bit or the activation bit of the alternating transmission being set, or the alternating TB transmission mode being used in the current TB scheduling transmission.

For the TB transmitted in the conventional way, the corresponding HARQ feedback can still be transmitted in the existing one-to-one transmission or repeated transmission.

In this way, only for the HARQ feedbacks of TBs transmitted alternately, the overlapping of HARQ feedbacks of any multiple TBs in time domain resources can be reduced by generating the HARQ feedback information for transmitting.

This solution is applicable to the scenario where the base station is configured with an MTC client to allow alternating transmission, but the MTC client does not always use such solution in each subsequent transmission. The MTC client generates the HARQ feedback information only when the base station activates the alternating transmission function.

In some embodiments, the preset condition includes: transmission configuration information of the sent TBs indicating that alternating transmission of TBs is allowed, and time domain resources for transmitting the HARQ feedbacks of any multiple TBs received having an overlap.

In some embodiments, the time domain resources for transmitting the HARQ feedbacks of any multiple TBs received may be determined according to transmission configuration information and a number of repeated transmissions of physical uplink control channel (PUCCH).

Specifically, the preset estimation rule may be based on settings such as TB repetition times, total repetition times, PUCCH repeated transmission times, time domain resources used by transmitting TB and HARQ feedback in the TB alternating transmission. The Base station and MTC client can calculate the possibility of overlapping of time domain resources used to transmit HARQ feedbacks according to the alternating transmission mode of transmission configuration information of TB and the repeated transmission times of PUCCH. The alternating transmission mode may be the number of repeated transmissions of each TB in an alternating transmission unit. As shown in FIG. 3, the number of repeated transmissions for each TB in an alternating transmission unit is 2, and the number of repeated transmissions for PUCCH is 4. At this time, if one-to-one HARQ feedback is adopted, the time domain resources of PUCCH used to transmit HARQ feedbacks are highly likely to overlap. At this time, HARQ feedback information can be generated from HARQ feedbacks of any multiple TBs. The number of repeated transmissions of PUCCH can represent the number of repeated transmissions of HARQ feedbacks in the transmission.

Based on the same preset estimation rules, the base station and MTC client can estimate the overlapping PUCCH resources used to transmit HARQ feedback. At this time, the MTC client generates the HARQ feedback information from HARQ feedbacks of any multiple TBs and transmits the HARQ feedback information. The base station receives the HARQ feedback information. In this way, the time overlap of HARQ feedbacks can be avoided and the failure rate of HARQ feedback transmission can be reduced.

For example, when the transmission configuration information determines that alternating TB transmission is allowed and there is overlap in the time domain resources used to transmit HARQ feedbacks of any multiple TBs received, the base station and MTC client adopt the default transmission mode, that is, the MTC client generates the HARQ feedback information according to multiple HARQ feedbacks of any TBs, and then transmits the HARQ feedback information, and the base station receives the HARQ feedback information.

If the base station has configured HARQ feedback binding transmission by the base station instruction, the transmission is carried out as configured.

If the base station is not configured to adopt HARQ feedback binding transmission, the base station can calculate according to the alternating transmission mode configured to the user and the repeated transmission times of PUCCH. If the time domain resources of PUCCH used to transmit HARQ feedbacks overlap, then the HARQ feedback information is received. If there is no time domain resource overlap, the base station receives the HARQ feedbacks transmitted in the initial one-to-one HARQ feedback transmission mode.

In some embodiments, the preset condition includes: the sent HARQ feedback transmission configuration instruction indicates that the terminal encodes HARQ feedbacks of any multiple TBs received to generate the HARQ feedback information.

Here, the base station instruction can be used to control whether the MTC client transmits HARQ feedbacks by generating the HARQ feedback information.

Figure 8:
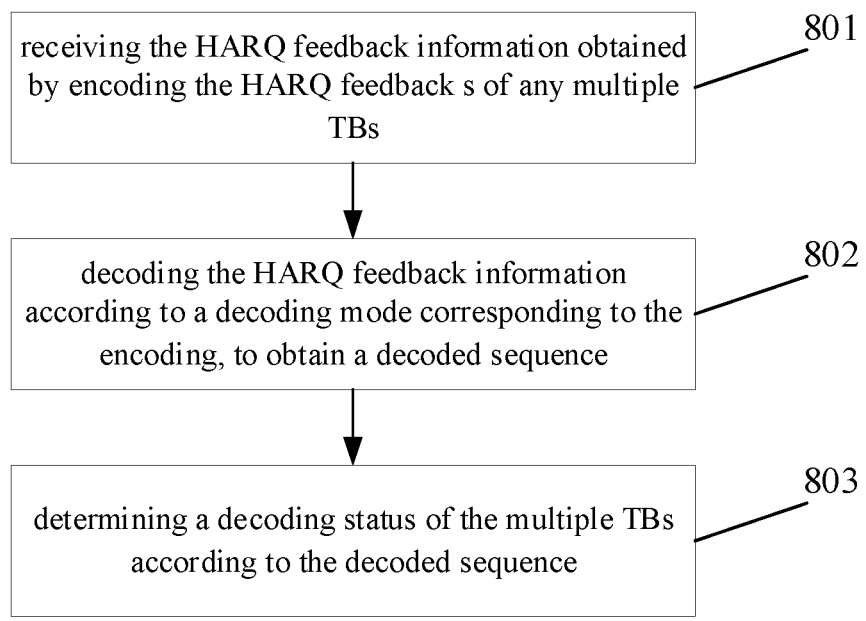
FIG. 8 is a flow chart illustrating receiving HARQ feedback information according to an exemplary embodiment.

In an embodiment, the base station receives the HARQ feedback information, as shown in FIG. 8, which includes the following steps:
- step 801, receiving the HARQ feedback information obtained by encoding HARQ feedbacks of any multiple TBs;
- Step 802, decoding the HARQ feedback information according to the demodulation mode corresponding to the encoding, to obtain a decoded sequence;
- step 803, determining the demodulation status of the multiple TBs according to the decoded sequence.

The alternating transmission of multiple different TBs includes: transmitting TB alternating transmission units cyclically until a total number of repeated transmissions configured for each TB is met. The TB alternating transmission unit contains N repeated transmission of different TBs, where N is greater than 0 and less than the total number of repeated transmissions.

One TB alternating transmission unit includes at least two TBs, which are sorted in a certain order to form one TB alternating transmission unit.

Here, the TB alternating transmission unit can be sent by the TB sender such as the base station. The HARQ feedback sender, such as the MTC client, decodes TBs after receiving multiple different TBs, obtains one HARQ feedback information from respective TBs through predetermined encoding, and sends the HARQ feedback information after modulation through the modulation mode corresponding to predetermined encoding, which can reduce the overlapping situation of HARQ feedbacks in time, reduce the complexity of the HARQ feedback sender processing the HARQ feedbacks, reduce the performance requirements of the HARQ feedback sender, and further improve the success rate of HARQ feedback information sending and improve the stability of the HARQ feedback sender. Here, a HARD feedback can be transmitted with a time domain resource. The HARQ feedback information obtained by encoding can reflect the demodulation status of multiple different TBs.

The HARQ feedback receiver, such as the base station, decodes the received HARQ feedback information using the demodulation mode corresponding to the predetermined encoding to obtain the decoded sequence, which can reflect the demodulation status of multiple different TBs.

In some embodiments, if the decoded sequence is a default sequence, it is determined that multiple different TBs are received successfully.

The preset sequence can be determined according to the preset encoding mode. If "1" in the result generated by the predetermined encoding mode represents that multiple different TBs are received successfully, the preset sequence can be set to "1".

Specifically, as shown in FIG. 5, the HARQ feedback sender such as MTC client can perform the predetermined encoding, such as logic and processing, on the HARQ feedbacks corresponding to TB1 to TB4 respectively, so as to obtain the HARQ feedback information reflecting the overall demodulation situation of TB1 to TB4. The HARQ feedback can use "0" to indicate demodulation failure and "1" to indicate demodulation success. For example, if the HARQ feedbacks of TB1, TB2, TB3 and TB4 are "1", the HARQ feedback information "1" is obtained after bitwise logic and operation of all HARQ feedbacks, indicating that the demodulations of TB1, TB2, TB3 and TB4 are successful. Here, the preset sequence can be set to "1".

When the preset sequence is "1", and the decoded sequence obtained by the HARQ feedback receiver after receiving and demodulating the HARQ feedback information is "1", which is consistent with the preset sequence, it is considered that all the multiple TBs are demodulated successfully.

In some embodiments, if the decoded sequence is not the preset sequence, it is determined that at least one TB has not been demodulated successfully.

For example, the prese sequence is "1", and if one of the HARQ feedbacks of TB1, TB2, TB3 and TB4 is "0", the HARQ feedback information "0" is obtained after bitwise logic and operation of all HARQ feedbacks, indicating that at least one of the demodulations of TB1, TB2, TB3 and TB4 fails.

If the HARQ feedback receiver, such as the base station, obtains the decoded sequence after receiving and demodulating the HARQ feedback information as "0", which is inconsistent with the preset sequence, it is considered that at least one TB has not been demodulated successfully.

In some embodiments, if at least one TB fails to be demodulated, the entire TB alternating transmission unit is retransmitted.

Here, after determining that at least one TB in the TB alternating transmission unit fails to be demodulated successfully, the base station can re-transmit the TB alternating transmission unit.

In some embodiments, the demodulation of BPSK or QPSK is used to decode the HARQ feedback information and obtain the decoded sequence.

The predetermined encoding may include bitwise logic and operation for HARQ feedbacks of multiple different TBs to obtain 1-bit HARQ feedback information, and may also include bitwise logic and operation for HARQ feedback of multiple different TBs according to groups to obtain groups of HARQ feedback, and combining different groups of HARQ feedbacks to obtain 2-bit HARQ feedback information.

BPSK modulation can be used to send 1-bit HARQ feedback information generated after predetermined encoding. Therefore, BPSK demodulation can be used to decode the HARQ feedback information at the HARQ feedback receiver.

QPSK modulation can be used to send 2-bit HARQ feedback information generated after predetermined encoding. Therefore, QPSK demodulation can be used to decode the HARQ feedback information at the HARQ feedback receiver.

In this embodiment, for the HARQ feedbacks of multiple different TBs alternately transmitted, the HARQ feedback receiver receives the HARQ feedback information of multiple different TBs generated from performing the predetermined encoding on HARQ feedbacks, so as to determine the demodulation status of multiple TBs. In this way, HARQ feedbacks of different TBs can avoid occupying the same time domain resources and complexity introduced by requiring orthogonal transmission in the time domain, thus reducing the processing complexity of the HARQ feedback sender when sending HARQ feedbacks, and especially for MTC terminals with weak processing capacity, reducing the sending failure caused by the high complexity of sending HARQ feedbacks and improving the success rate of sending HARQ feedbacks.

A few concrete examples are provided below in combination with any of the above embodiments.

Solution core: Pre-define a set of HARQ feedback transmission mode rules in advance, so that the base station and MTC client can automatically switch the HARQ feedback mode, avoiding HARQ feedbacks of any multiple TBs overlap in time, and reducing signaling overhead.

Scheme 1: Once the MTC client is configured to allow alternating transmission, the base station and the MTC client adopt HARQ feedback binding transmission by default. At this time, the base station does not need additional signaling to configure the HARQ feedback mode of the user.

Here, binding transmission refers to the generation and transmission of HARQ feedback information based on HARQ feedbacks of any multiple TBs.

Scheme 2: When the MTC client is configured to use alternating transmission and the time domain resources of PUCCH used to transmit HARQ feedbacks overlap, the base station and MTC client adopt HARQ feedback binding transmission mode by default.

If the base station is already configured with HARQ feedback binding transmission, the transmission is carried out as configured.

If the base station is not configured with HARQ feedback binding transmission at the beginning, at the base station end, the base station can calculate according to the repeated transmission times of PUCCH and the alternating transmission mode in the transmission configuration information of transmission block TB configured to the MTC client. If there are overlapping PUCCH time domain resources used for transmission of HARQ feedback, HARQ feedback binding transmission is used, otherwise one-to-one HARQ feedback is used.

The base station and MTC client can calculate the possibility of overlapping time domain resources used to transmit HARQ feedbacks according to the repeated transmission times of PUCCH and the alternating transmission mode of TB transmission configuration information. The alternating transmission mode may be the number of repeated transmissions per TB in an alternate transmission unit. As shown in FIG. 3, the number of repeated transmissions for each TB in an alternate transmission unit is 2, and the number of repeated transmissions for PUCCH is 4. At this time, if one-to-one HARQ feedback is adopted, the time domain resources of PUCCH used to transmit HARQ feedbacks are highly likely to overlap. At this time, HARQ feedback information can be generated from HARQ feedbacks of any multiple TBs.

Scheme 3: When the MTC client is configured to use the alternating transmission mode, and the alternating transmission mode is activated, HARQ feedback binding transmission is used regardless of whether the base station is configured.

This solution is mainly for scenarios where the base station is configured with an MTC client to allow alternating transmission, but the MTC client does not necessarily use it for each subsequent transmission. The MTC client uses HARQ feedback binding transmission only when the base station has enabled the alternating transmission function.

Scheme 4: When the MTC client is configured to use the alternating transmission mode, and the time domain resources of PUCCH used to transmit HARQ feedbacks overlap, the base station and the user adopt the HARQ feedback binding transmission mode by default.

Figure 9:
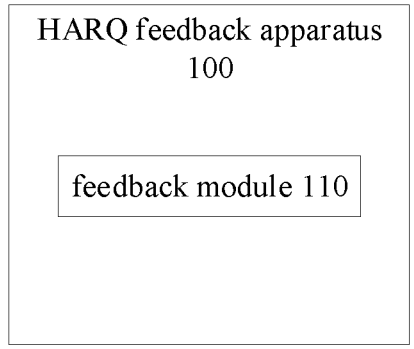
FIG. 9 is a block diagram illustrating an apparatus for transmitting HARQ feedback according to an exemplary embodiment.

Embodiments of the present disclosure further provide an apparatus for transmitting HARQ feedbacks applied to a terminal. FIG. 9 is a block diagram of an apparatus 100 for transmitting HARQ feedbacks provided by embodiments of the present disclosure. As illustrated in FIG. 9, the apparatus 100 includes a feedback module 110.

The feedback module 110 is configured to, when a preset condition is met, for a multi-transmission block TB scheduling transmission, adopting a target HARQ feedback transmission mode to transmit HARQ feedbacks, wherein adopting the target HARQ feedback transmission mode to transmit HARQ feedbacks includes: encoding HARQ feedbacks of any multiple TBs received to generate and transmit HARQ feedback information.

The multi-TB scheduling transmission is configured to transmit multiple TBs with a physical downlink control channel PDCCH resource.

In some embodiments, the preset condition includes:
transmission configuration information of the received TBs indicating that alternating transmission of TBs is allowed.

In some embodiments, the preset condition includes:
transmission configuration information of the received TBs indicating that alternating transmission of TBs is allowed, and an alternating TB transmission mode having been activated.

In some embodiments, the preset condition includes:
transmission configuration information of the received TBs indicating that alternating transmission of TBs is allowed, and determining that the alternating TB transmission mode is used in a current TB scheduling transmission.

In some embodiments, the preset condition includes:
transmission configuration information of the received TBs indicating that alternating transmission of TBs is allowed, and time domain resources for transmitting the HARQ feedbacks of any multiple TBs received having an overlap.

Figure 10:
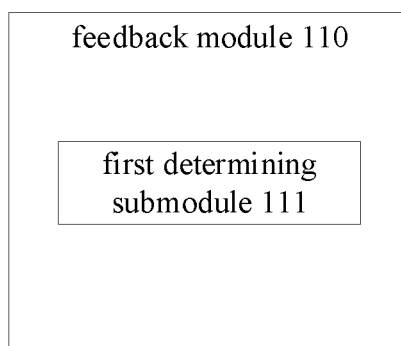
FIG. 10 is a block diagram illustrating an apparatus for transmitting HARQ feedback according to another exemplary embodiment.

In some embodiments, as illustrated in FIG. 10, the feedback module 110 further includes a first determining submodule 111.

The first determining submodule 111 is configured to determine the time domain resources for transmitting the HARQ feedbacks of any multiple TBs received according to transmission configuration information and a number of repeated transmissions of physical uplink control channel PUCCH.

In some embodiments, the preset condition includes:
the transmission configuration information of the received TBs indicating that the alternating transmission of TBs is allowed, a HARQ feedback transmission configuration instruction received from the base station indicating that multiple HARQ feedbacks of any TBs received are encoded to generate the HARQ feedback information.

Figure 11:
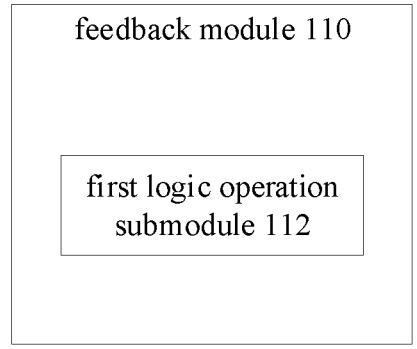
FIG. 11 is a block diagram illustrating an apparatus for transmitting HARQ feedback according to yet another exemplary embodiment.

In some embodiments, as illustrated in FIG. 11, the feedback module 110 includes a first logic operation submodule 112.

The first logic operation submodule 112 is configured to perform a bitwise logic and operation on the HARQ feedbacks of any multiple TBs to obtain the HARQ feedback information.

Figure 12:
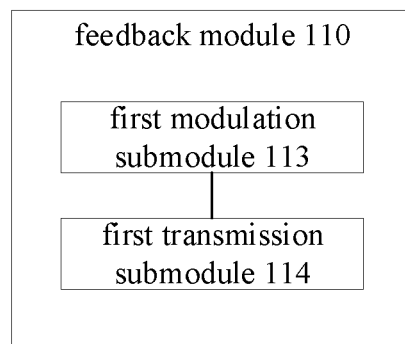
FIG. 12 is a block diagram illustrating an apparatus for transmitting HARQ feedback according to still another exemplary embodiment.

In some embodiments, as illustrated in FIG. 12, the feedback module 110 includes a first modulation submodule 113 and a first transmission submodule 114.

The first modulation submodule 113 is configured to modulate the HARQ feedback information by a binary phase shift keying BPSK.

The first transmission submodule 114 is configured to transmit the BPSK modulated HARQ feedback information.

Figure 13:
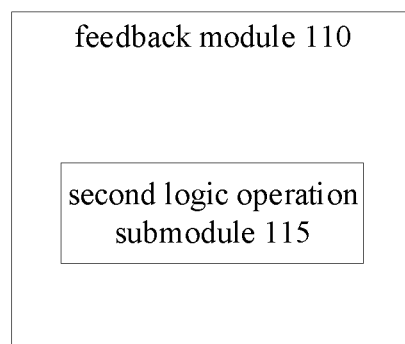
FIG. 13 is a block diagram illustrating an apparatus for transmitting HARQ feedback according to still yet another exemplary embodiment.

In some embodiments, as illustrated in FIG. 13, the feedback module 110 includes a second logic operation submodule 115.

The second logic operation submodule 115 is configured to perform a bitwise logic and operation on the HARQ feedbacks of any multiple TBs according to groups, to obtain different groups of HARQ feedbacks; and combine the different groups of HARQ feedback to obtain the HARQ feedback information.

Figure 14:
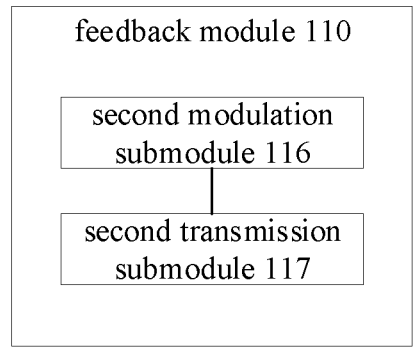
FIG. 14 is a block diagram illustrating an apparatus for transmitting HARQ feedback according to still yet another exemplary embodiment.

In some embodiments, as illustrated in FIG. 14, the feedback module 110 includes a second modulation submodule 116 and a second transmission submodule 117.

The second modulation submodule 116 is configured to modulate the HARQ feedback information by a quadrature phase shift keying QPSK.

The second transmission submodule 117 is configured to transmit the QPSK modulated HARQ feedback information.

In some embodiments, the alternating transmission of TBs includes: transmitting TB alternating transmission units cyclically until a total number of repeated transmission configured for each TB is met, wherein the TB alternating transmission unit contains N repeated transmission of different TBs, where N is greater than 0 and less than M, and M is the total number of repeated transmission.

Figure 15:
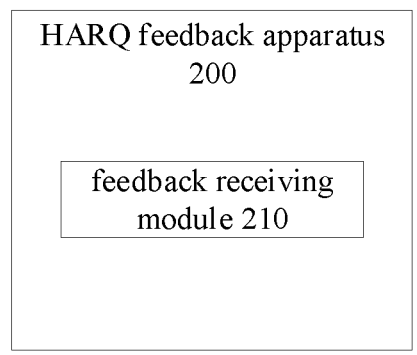
FIG. 15 is a block diagram illustrating an apparatus for transmitting HARQ feedback according to an exemplary embodiment.

Embodiments of the present disclosure further provide an apparatus for transmitting HARQ feedbacks applied to a base station. FIG. 15 is a block diagram of an apparatus 200 for transmitting HARQ feedbacks provided by embodiments of the present disclosure. As illustrated in FIG. 15, the apparatus 200 includes a feedback receiving module 210.

The feedback receiving module 210 is configured to, when a preset condition is met, for a multi-transmission block TB scheduling transmission, adopting a target HARQ feedback receiving mode to receive HARQ feedbacks, wherein adopting the target HARQ feedback receiving mode to receive HARQ feedbacks includes: receiving HARQ feedback information generated and transmitted by a terminal through encoding multiple HARQ feedbacks of any TBs received.

The multi-TB scheduling transmission is configured to transmit multiple TBs with a physical downlink control channel PDCCH resource.

In some embodiments, the preset condition includes:
transmission configuration information of the sent TBs indicating that alternating transmission of TBs is allowed.

In some embodiments, the preset condition includes:
transmission configuration information of the sent TBs indicating that alternating transmission of TBs is allowed, and an alternating TB transmission mode having been activated.

In some embodiments, the preset condition includes:
transmission configuration information of the sent TBs indicating that alternating transmission of TBs is allowed, and time domain resources for transmitting the multiple HARQ feedbacks of any TBs received having an overlap.

Figure 16:
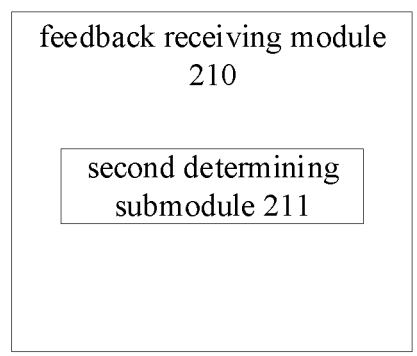
FIG. 16 is a block diagram illustrating an apparatus for transmitting HARQ feedback according to another exemplary embodiment.

In some embodiments, as illustrated in FIG. 16, the feedback receiving module 210 further includes a second determining submodule 211.

The second determining submodule 211 is configured to determine the time domain resources for transmitting the multiple HARQ feedbacks of any TBs according to transmission configuration information and a number of repeated transmissions of physical uplink control channel PUCCH.

In some embodiments, the preset condition includes:
a HARQ feedback transmission configuration instruction sent indicating that the terminal encodes multiple HARQ feedbacks of any TBs received to generate the HARQ feedback information.

Figure 17:
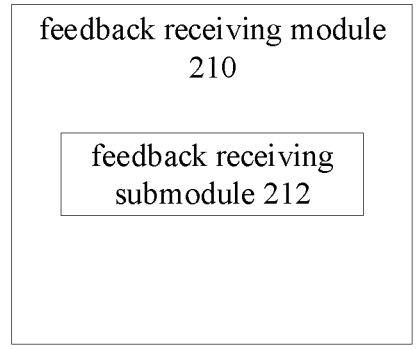
FIG. 17 is a block diagram illustrating an apparatus for transmitting HARQ feedback according to yet another exemplary embodiment.

In some embodiments, as illustrated in FIG. 17, the feedback receiving module 210 includes a feedback receiving submodule 212.

The feedback receiving submodule 212 is configured to receive the HARQ feedback information obtained by encoding the multiple HARQs of any TBs;
decode the HARQ feedback information according to a decoding mode corresponding to the encoding, to obtain a decoded sequence; and
determine a decoding status of the multiple TBs according to the decoded sequence.

Figure 18:
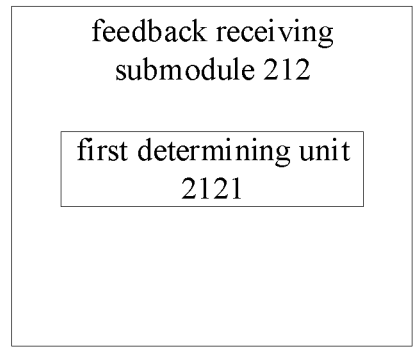
FIG. 18 is a block diagram illustrating an apparatus for transmitting HARQ feedback according to still another exemplary embodiment.

In some embodiments, as illustrated in FIG. 18, the feedback receiving submodule 212 includes a first determining unit 2121.

The first determining unit 2121 is configured to, if the decoded sequence is a preset sequence, determine that the multiple different TBs are received successfully.

Figure 19:
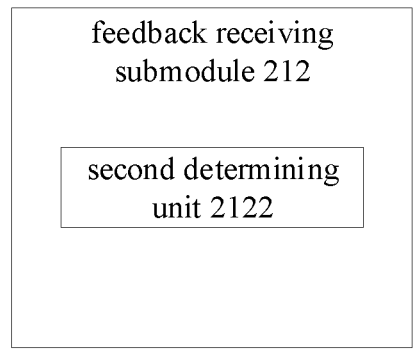
FIG. 19 is a block diagram illustrating an apparatus for transmitting HARQ feedback according to still yet another exemplary embodiment.

In some embodiments, as illustrated in FIG. 19, the feedback receiving submodule 212 includes a second determining unit 2122.

The second determining unit 2122 is configured to, if the decoded sequence is not a preset sequence, determine that at least one TB fails to be demodulated.

Figure 20:
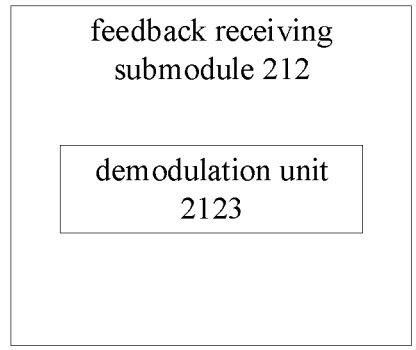
FIG. 20 is a block diagram illustrating an apparatus for transmitting HARQ feedback according to still yet another exemplary embodiment.

In some embodiments, as illustrated in FIG. 20, the feedback receiving submodule 212 includes a demodulation unit 2123.

The demodulation unit 2123 is configured to decode the HARQ feedback information by the decoding mode of binary phase shift keying BPSK or quadrature phase shift keying QPSK, to obtain the decoded sequence.

In some embodiments, the alternating transmission of TBs includes: transmitting TB alternating transmission units cyclically until a total number of repeated transmission configured for each TB is met, wherein the TB alternating transmission unit contains N repeated transmission of different TBs, where N is greater than 0 and less than M, and M is the total number of repeated transmission.

In exemplary embodiments, the feedback module 110, the feedback receiving module 210, etc., can be implemented by one or more Central Processing units (CPUs), Graphics Processing units (GPUs), Baseband Processor, Application Specific Integrated Circuit (ASIC), DSP, Programmable logic device (PLD), Complex Programmable Logic Device (CPLD), Field Programmable Gate array (FPGA), universal processors, controllers, micro controller units (MCUs), microprocessors, and other electronic components; or can also be implemented in combination with one or more radio frequency (RF) antennas to perform the above methods.

Figure 21:
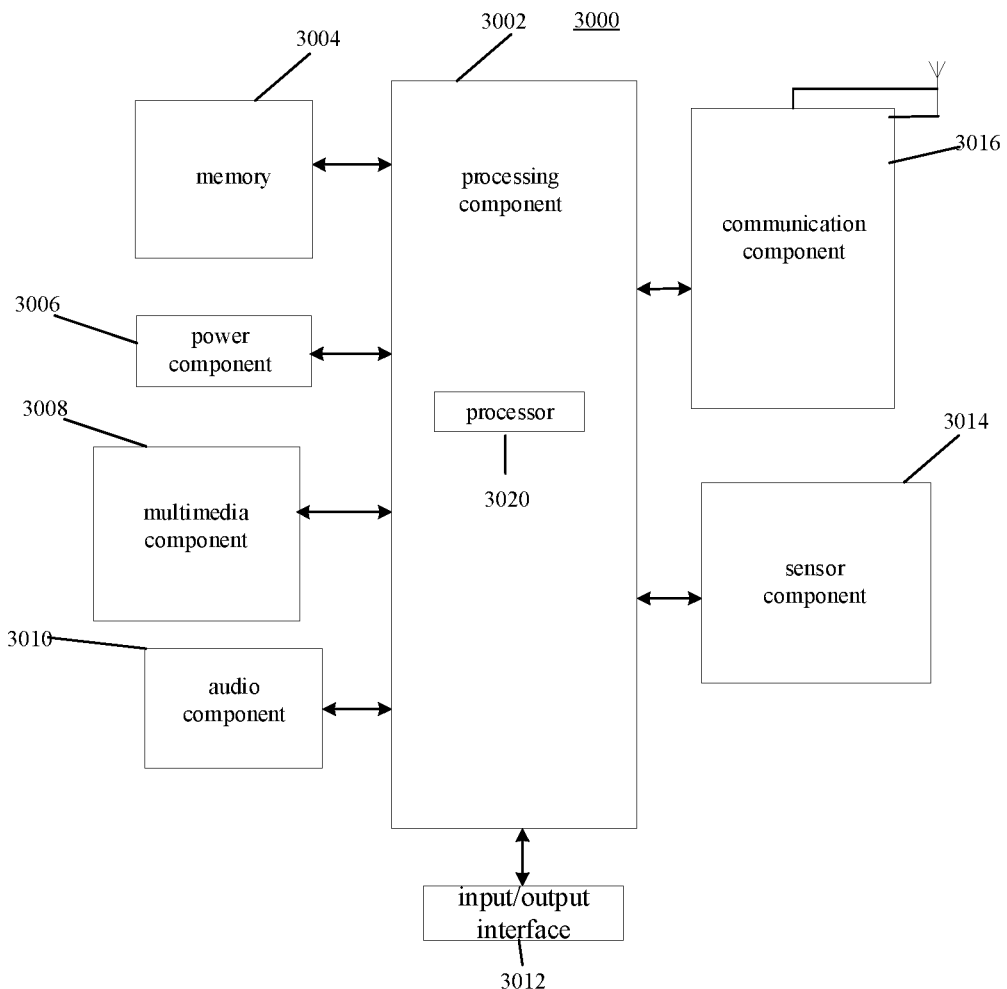
FIG. 21 is a block diagram illustrating an apparatus for transmitting HARQ feedback according to another exemplary embodiment.

FIG. 21 is a block diagram of an apparatus 3000 for HARQ feedback based on an exemplary embodiment. For example, the apparatus 3000 may be a mobile phone, computer, digital broadcast terminal, messaging device, game console, tablet device, medical device, fitness device, personal digital assistant, etc.

Referring to FIG. 21, the apparatus 3000 may include one or more of the following components: processing component 3002, memory 3004, power component 3006, multimedia component 3008, audio component 3010, input/output (I/O) interface 3012, sensor component 3014, and communication component 3016.

The processing component 3002 generally controls the whole operation of the apparatus 3000, such as the operations related to display, phone call, data communication, camera operation and recording operation. The processing component 3002 may include one or more processors 3020 to perform instructions, to complete all or part of steps of the above method. In addition, the processing component 3002 may include one or more modules for the convenience of interaction between the processing component 3002 and other components. For example, the processing component 3002 may include a multimedia module for the convenience of interaction between the multimedia component 3008 and the processing component 3002.

The memory 3004 is configured to store all types of data to support the operation of the apparatus 3000. Examples of the data include the instructions of any applications or methods operated on the apparatus 3000, contact data, phone book data, messages, pictures, videos, etc. The memory 3004 may be implemented by any type of volatile or non-volatile storage devices or their combination, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), Magnetic Memory, Flash Memory, Magnetic Disk or Optical Disk.

The power component 3006 may provide power supply for all components of the apparatus 3000. The power component 3006 may include power supply management system, one or more power supplies, and other units related to generating, managing and distributing power for the apparatus 3000.

The multimedia component 3008 includes an output interface screen provided between the apparatus 3000 and the user. In some examples, a screen may include a liquid crystal display (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some examples, the multimedia component 3008 includes a front camera and/or a rear camera. When the apparatus 3000 is in operation mode, such as shooting mode or video mode, the front camera or the rear camera may receive the external multimedia data. Each front camera and rear camera may be a fixed optical lens system or an optical lens system with focal length and optical zoom capacity.

The audio component 3010 is configured to output and/or input audio signals. For example, the audio component 3010 includes a microphone (MIC). When the apparatus 3000 is in operation mode, such as call mode, record mode, and speech recognition mode, the microphone is configured to receive the external audio signals. The audio signals received may be further stored in the memory 3004 or transmitted via the communication component 3016. In some examples, the audio component 3010 further includes a speaker configured to output an audio signal.

The I/O interface 3012 provides an interface for the processing component 3002 and the peripheral interface module, and the peripheral interface module may be a keyboard, a click wheel, a button, etc. The buttons may include but not limited to a home button, a volume button, a start button and a lock button.

The sensor component 3014 includes one or more sensors, configured to provide various aspects of status assessment for the apparatus 3000. For example, the sensor component 3014 may detect the on/off state of the apparatus 3000 and the relative positioning of the component. For example, the component is a display and a keypad of the apparatus 3000. The sensor component 3014 may further detect the location change of the apparatus 3000 or one component of the apparatus 3000, the presence or absence of contact between the user and the apparatus 3000, the orientation or acceleration/deceleration of the apparatus 3000, and the temperature change of the apparatus 3000. The sensor component 3014 may include a proximity sensor, which is configured to detect the existence of the objects nearby without any physical contact. The sensor component 3014 may further include a light sensor such as CMOS or CCD image sensor, which is configured to use in imaging applications. In some examples, the sensor component 3014 may further include an acceleration transducer, a gyroscope sensor, a magnetic sensor, a pressure sensor or a temperature sensor.

The communication module 3016 is configured for the convenience of wire or wireless communication between the apparatus 3000 and other devices. The apparatus 3000 may access wireless networks based on communication standard, such as WiFi, 2G or 3G or their combination. In an example of the present disclosure, the communication component 3016 receives broadcast signals or broadcast-related information from an external broadcast management system via a broadcast channel. In an example of the present disclosure, the communication component 3016 further includes a near field communication (NFC) module to facilitate short-range communication. For example, an NFC module may be implemented based on radio frequency identification (RFID) technology, infrared data association (IRDA) technology, ultra-wideband (UWB) technology, Bluetooth (BT) technology and other technologies.

In exemplary embodiments, the apparatus 3000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In exemplary embodiments, a non-temporary computer readable storage medium is further provided, for example, the memory 3004 including instructions, in which the instructions may be executed by the processor 3020 of the apparatus 3000 to complete the above methods. For example, the non-temporary computer readable storage medium may be a ROM, a random access memory (RAM), a CD-ROM, a magnetic tape, a floppy disk, an optical data storage device, etc.

After considering the specification and practicing the disclosure herein, those skilled in the art will easily think of other examples of the present application. The present application is intended to cover any variations, usages, or adaptive changes of the present application. These variations, usages, or adaptive changes follow the general principles of the present application and include common knowledge or conventional technical means in the technical field not disclosed by the present application. The description and the examples are to be regarded as exemplary only, and the true scope and spirit of the present application are referred to the appended claims.

It should be understood that the present disclosure is not limited to the precise structure described above and shown in the drawings, and various modifications and changes may be made without departing from its scope. The scope of embodiments of the present disclosure is only limited by the appended claims.

What is claimed is:

1. A method for transmitting hybrid automatic repeat request (HARQ) feedbacks, performed by a terminal, comprising:
adopting, a target HARQ feedback transmission mode to transmit HARQ feedbacks, for a multi-transmission block (multi-TB) scheduling transmission when a preset condition is met; wherein adopting the target HARQ feedback transmission mode to transmit HARQ feedbacks comprises: encoding HARQ feedbacks of any multiple transmission blocks (TBs) received to generate and transmitting HARQ feedback information,
wherein the multi-TB scheduling transmission is configured to transmit multiple TBs with a physical downlink control channel PDCCH resource;
wherein the preset condition comprises:
transmission configuration information of the received TBs indicating that alternating transmission of TBs is allowed, and a HARQ feedback transmission configuration instruction received from base station indicating that the terminal encodes the HARQ feedbacks of any multiple TBs received to generate the HARQ feedback information;
the method further comprising:
determining time domain resources for transmitting the HARQ feedbacks of any multiple TBs received according to transmission configuration information and a number of repeated transmissions of physical uplink control channel PUCCH.

2. The method of claim 1, wherein the preset condition comprises:
an alternating TB transmission mode having been activated.

3. The method of claim 1, wherein the preset condition comprises:
    determining that the alternating TB transmission mode is used in a current TB scheduling transmission.

4. The method of claim 1, wherein the preset condition comprises:
    the time domain resources for transmitting the HARQ feedbacks of any multiple TBs received having an overlap.

5. The method of claim 1, wherein encoding HARQ feedbacks of any multiple TBs received comprises:
    performing a bitwise logic and operation on the HARQ feedbacks of any multiple TBs to obtain the HARQ feedback information.

6. The method of claim 5, further comprising:
    modulating the HARQ feedback information by a binary phase shift keying BPSK;
    transmitting the BPSK modulated HARQ feedback information.

7. The method of claim 1, wherein encoding HARQ feedbacks of any multiple TBs received comprises:
    performing a bitwise logic and operation on the HARQ feedbacks of any multiple TBs according to groups, to obtain different groups of HARQ feedbacks; and
    combining the different groups of HARQ feedbacks to obtain the HARQ feedback information.

8. The method of claim 7, further comprising:
    modulating the HARQ feedback information by a quadrature phase shift keying QPSK; and
    transmitting the QPSK modulated HARQ feedback information.

9. The method of claim 1, wherein the alternating transmission of TBs comprises:
    transmitting TB alternating transmission units cyclically until a total number of repeated transmission configured for each TB is met, wherein the TB alternating transmission unit contains N repeated transmission of different TBs, where N is greater than 0 and less than M, and M is the total number of repeated transmission.

10. A device, comprising a processor, a memory and an executable program stored on the memory and capable of being executed by the processor, wherein the processor is configured to implement a method for transmitting hybrid automatic repeat request (HARQ) feedbacks according to claim 1.

11. A method for transmitting hybrid automatic repeat request (HARQ) feedbacks, performed by a base station, comprising:
    adopting, a target HARQ feedback receiving mode to receive HARQ feedbacks, for a multi-transmission block (multi-TB) scheduling transmission, when a preset condition is met; wherein adopting the target HARQ feedback receiving mode to receive HARQ feedbacks comprises: receiving HARQ feedback information generated and transmitted by a terminal through encoding HARQ feedbacks of any multiple transmission blocks (TBs) received,
    wherein the multi-TB scheduling transmission is configured to transmit multiple TBs with a physical downlink control channel PDCCH resource;
    wherein the preset condition comprises:
    transmission configuration information of sent TBs indicating that alternating transmission of TBs is allowed, and a HARQ feedback transmission configuration instruction sent indicating that the terminal encodes the HARQ feedbacks of any multiple TBs received to generate the HARQ feedback information;
    the method further comprising:
    determining time domain resources for transmitting the HARQ feedbacks of any multiple TBs received according to transmission configuration information and a number of repeated transmissions of physical uplink control channel PUCCH.

12. The method of claim 11, wherein receiving the HARQ feedback information comprises:
    receiving the HARQ feedback information obtained by encoding the HARQ feedback-s of any multiple TBs; and
    decoding the HARQ feedback information according to a decoding mode corresponding to the encoding, to obtain a decoded sequence; and
    determining a decoding status of the multiple TBs according to the decoded sequence.

13. The method of claim 12, wherein determining the decoding status of the multiple TBs according to the decoded sequence comprises:
    determining, multiple different TBs received successfully;
    wherein the decoded sequence is a preset sequence.

14. The method of claim 12, wherein determining the decoding status of the multiple TBs according to the decoded sequence comprises:
    determining, at least one TB fails to be demodulated;
    wherein the decoded sequence is not a preset sequence.

15. The method of claim 12, wherein decoding the HARQ feedback information according to the decoding mode corresponding to the encoding, to obtain the decoded sequence, comprises:
    decoding the HARQ feedback information by the decoding mode of binary phase shift keying BPSK or quadrature phase shift keying QPSK, to obtain the decoded sequence.

16. The method of claim 11, wherein the alternating transmission of TBs comprises:
    transmitting TB alternating transmission units cyclically until a total number of repeated transmission configured for each TB is met, wherein the TB alternating transmission unit contains N repeated transmission of different TBs, where N is greater than 0 and less than M, and M is the total number of repeated transmission.

17. A device, comprising a processor, a memory and an executable program stored on the memory and capable of being executed by the processor, the executable program including instructions to:
    adopt a target HARQ feedback transmission mode to transmit HARQ feedbacks, for a multi-transmission block (multi-TB) scheduling transmission, when a preset condition is met; wherein adopting the target HARQ feedback transmission mode to transmit HARQ feedbacks comprises: encoding HARQ feedbacks of any multiple transmission blocks (TBs) received to generate and transmit HARQ feedback information,
    wherein the multi-TB scheduling transmission is configured to transmit multiple TBs with a physical downlink control channel PDCCH resource;
    wherein the preset condition comprises:
    transmission configuration information of the received TBs indicating that alternating transmission of TBs is allowed, and a HARQ feedback transmission configuration instruction sent indicating that the terminal encodes the HARQ feedbacks of any multiple TBs received to generate the HARQ feedback information;
    further comprising:
    determining time domain resources for transmitting the HARQ feedbacks of any multiple TBs received according to transmission configuration information and a number of repeated transmissions of physical uplink control channel PUCCH.

* * * * *